United States Patent
Hutten et al.

(10) Patent No.: US 11,443,489 B2
(45) Date of Patent: Sep. 13, 2022

(54) CROSS-PLATFORM AVATAR BANKING AND REDEMPTION

(71) Applicant: Wormhole Labs, Inc., Huntington Beach, CA (US)

(72) Inventors: Curtis Hutten, Laguna Beach, CA (US); Robert D. Fish, Irvine, CA (US); Brian J. Kim, Walnut, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 17/005,925

(22) Filed: Aug. 28, 2020

(65) Prior Publication Data
US 2022/0068028 A1    Mar. 3, 2022

(51) Int. Cl.
*G06T 19/00*    (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | |
|---|---|---|
| 7,249,139 B2 | 7/2007 | Chuah |
| 7,522,912 B2 | 4/2009 | Seo |
| 7,734,912 B2 | 6/2010 | Ganesan |
| 8,108,459 B1 | 1/2012 | Hoffman |
| 8,145,544 B2 | 3/2012 | Leal |
| 8,250,144 B2 | 8/2012 | Blattner |
| 8,253,743 B2 * | 8/2012 | Lee .................. A63F 13/12 345/473 |
| 8,291,016 B1 | 10/2012 | Whitney |
| 8,874,909 B2 | 10/2014 | Lutz |
| 8,968,099 B1 | 3/2015 | Hanke |
| 9,062,583 B1 | 6/2015 | Harp |
| 9,223,469 B2 | 12/2015 | Neustaedter |
| 9,311,741 B2 | 4/2016 | Rogers |
| 9,582,965 B1 | 2/2017 | Schultz |
| 9,656,169 B2 | 5/2017 | Crocker |
| 9,665,239 B1 | 5/2017 | Koh |
| 10,099,115 B2 | 10/2018 | Butler |
| 10,286,324 B1 | 5/2019 | McLellan |
| 2006/0058014 A1 * | 3/2006 | Seo .................. H04W 4/00 455/418 |
| 2010/0060662 A1 * | 3/2010 | Law .................. A63F 13/79 345/629 |
| 2011/0184839 A1 * | 7/2011 | Chen .................. G06Q 30/0641 705/27.1 |

(Continued)

FOREIGN PATENT DOCUMENTS

WO    2007037590    4/2007

*Primary Examiner* — Robert J Craddock
(74) *Attorney, Agent, or Firm* — Fish IP Law, LLP (57) ABSTRACT

In a method modifying a user's virtual environment, a banking module retrieves and analyzes context data associated with the user. The banking module applies user and location parameters to determine whether at least one of an avatar modification and an environment modification is available for rendering. Responsive to determining that the avatar selection is not available for rendering, determining whether the avatar is accessible to the user. Responsive to determining that avatar is not accessible to the user, presenting the avatar selection for redemption.

6 Claims, 7 Drawing Sheets

(56) References Cited

U.S. PATENT DOCUMENTS

| | | | |
|---|---|---|---|
| 2011/0257985 A1 | 10/2011 | Goldstein | |
| 2011/0298897 A1* | 12/2011 | Sareen | G06T 19/00 |
| | | | 348/47 |
| 2012/0316999 A1 | 12/2012 | Koh | |
| 2013/0191178 A1 | 7/2013 | Thompson | |
| 2014/0164227 A1 | 6/2014 | Butler | |
| 2014/0188670 A1* | 7/2014 | Ajala | G06Q 30/0643 |
| | | | 705/27.2 |
| 2015/0287403 A1* | 10/2015 | Holzer Zaslansky | G10L 21/10 |
| | | | 704/231 |
| 2016/0078663 A1* | 3/2016 | Sareen | G06K 9/00369 |
| | | | 345/419 |
| 2017/0316617 A1* | 11/2017 | Jeong | G06T 13/40 |
| 2019/0043269 A1* | 2/2019 | Lin | G06T 17/00 |
| 2019/0325498 A1* | 10/2019 | Clark | G06K 7/1417 |
| 2019/0347703 A1* | 11/2019 | Bleicher | A61B 5/107 |
| 2020/0364533 A1* | 11/2020 | Sareen | G06Q 10/101 |

* cited by examiner

CROSS-PLATFORM AVATAR BANKING AND REDEMPTION

FIELD OF THE INVENTION

The field of the invention is management of mixed reality environments.

BACKGROUND

The inventive concepts herein aim to integrate combinations of augmented reality spaces, interactive objects, and virtual reality spaces to dynamically tailor environments based the local environmental context of the user and any associated parameters affecting user choices and/or actions.

Specifically, the present invention enables individuals to enter into the augmented reality spaces of others and interact with others, while the user's avatar and environment dynamically change based on user-based parameters and location-based parameters. While in a shared walkabout augmented reality space, the present invention allows a user to access a third-party data store or cooperative data stores to change, purchase, or interact in any manner with avatars across platforms.

In addressing the particular challenges of a cross-platform shared avatar banking system, the present application contemplates the use of banking parameters to control the manner in which users can use an avatar. For example, banking parameters can factor in parental controls and other filters when determining which avatars can be presented to a user for wear in a shared walkabout reality. In another example, banking parameters can limit a user to wearing a certain set of skins in a themed augmented reality environment, such as by limiting one or more wearable skins during a video game launch party to a density threshold to avoid repeating avatars.

The present invention further contemplates that a banking module manages one or more banking parameters to dynamically adapt to the actions of any one or more users. In some embodiments, the banking module can control the dissemination of avatars by actively modifying banking parameters. For example, the banking module can manage a contest for walkabout reality participants that unlocks a limited-edition skin for the first 100 users to visit 10 points of interest in a music festival.

Additionally, shared curated spaces can be morphed to a customized environment based on the users therein. For example, if the banking module determines that each user within an augmented reality or virtual space is a fan of a sci-fi television show, the banking module can morph currently equipped avatars and available avatars to reflect the shared interests of the user. In other instances, the environment can be morphed based on each user's unique interests.

U.S. Pat. No. 8,108,774 to Finn teaches an avatar mimicry system that copies the avatars of those around the subject. Finn fails to modify the avatar based on both user-based parameters and location-based parameters, which can create a shared reality without creating a homogenous mixture of avatars that are each mimicking each other.

US Patent Application Pub. No. 2012/0316999 to Koh teaches the generating, purchasing, and managing of virtual collectibles. However, Koh fails to contemplate the management of avatars and their relationship to other dynamic elements.

WIPO Patent Application Pub. No. 2007/037590 to Oh teaches an electronic commerce system that generates an avatar for a user and then allows the user to wear clothing offered in a virtual shopping mall. Oh teaches a curated and purely virtual system that mimics a shopping experience to allow users to shop for real world goods remotely. However, Oh also fails to contemplate the management of avatars and their relationship to other dynamic elements tied to real world walkabout realities. Further, Oh fails to contemplate the integration of augmented reality technologies and provide solutions to the novel challenges presented by augmented reality systems.

In gaming, it is generally known that players can move between virtual spaces by teleporting. However, these game worlds are largely tied to predetermined structures, limited customization specific to the game, and linked to other preselected areas. For example, a game such as The Sims™ allows users to engage with each other in a shared virtual space with each home built and accessorized using an in-game engine. Unlike The Sims™, the inventive concept herein contemplates a highly customizable mixed reality space that can link to any number of other customized mixed reality spaces. The present invention also contemplates enabling users to tie customizable functions, avatar appearances, and environmental features/effects.

Finn, Koh, Oh, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality system infrastructures that can customize user augmented realities and avatar characteristics dynamically based on the changing context of a user's current environment.

SUMMARY OF THE INVENTION

The inventive concept herein contemplates virtual reality, augmented reality, and/or mixed reality environments that are highly customizable with various interactive elements. It is contemplated that the interactive elements can be at least partially customized by a banking module associated with the mixed reality space. It is further contemplated that the banking module can analyze the context of a user's environment using a combination of data sources and, based on banking parameters, alter a user's environment and appearance accordingly.

The present invention contemplates that the banking module can identify a user and retrieve one or more user parameters associated with the user. The banking module retrieves and applies one or more banking parameters to the context data and determines whether at least one of an avatar modification and an environment modification is available. Based on the determination, the banking module constructs an avatar bank complying with both the user parameters and bank parameters. The banking module can determine that one or more avatars are available based on a mixture of user parameters and available location-specific modifications. For example, the banking module can present a user's purchased avatar bank, while restricting the equipping of one or more avatars based on a location-based rule restricting combat-themed avatars from rendering. Responsive to receiving a selection from a user and determining that the avatar is available for rendering, the banking module can render the avatar or a modified version of the avatar that complies with one or more limitations. For example, the banking module can cause one or more avatars in a user's virtual closet to appear unavailable for wear within 1000 feet from a school. Additionally, the banking module can allow a user to access a virtual avatar storefront and purchase any avatar the user wishes within 1000 feet from the school by restricting the user from wearing the avatar until the user moves to an unrestricted walkabout reality.

Modification to the user's virtual environment are contemplated to include both environmental features as well as the features associated with the user. For example, the user's virtual environment can include both the actual surroundings and the appearance of the user's avatar.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

For the purposes of this application, "portal" or any similar terms, such as "portalling" and "portalled" mean any connected between environments. Portals can be in the form of interactive objects, designated spaces, or any other form that allows a user to connect to other augmented realities and/or virtual realities.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
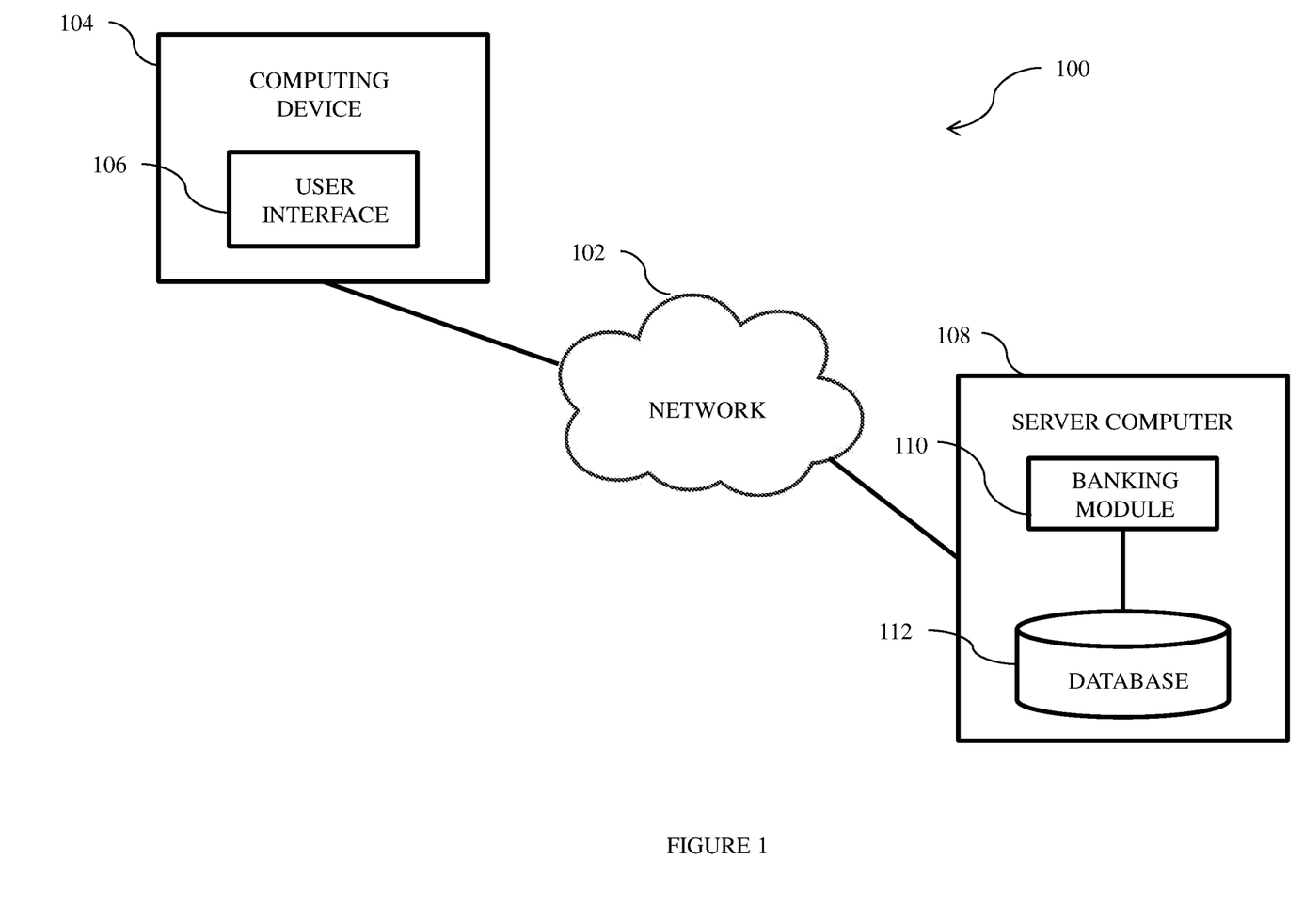
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to banking module 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure banking module 110 (discussed in more detail below) to enable a user to access a mixed reality space. It is contemplated that user interface 106 can allow a user to provide any information to banking module 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by banking module 110. In the depicted embodiment, banking module 110 resides on server computer 108. However, database 112 can reside anywhere within a distributed data processing environment provided that banking module 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
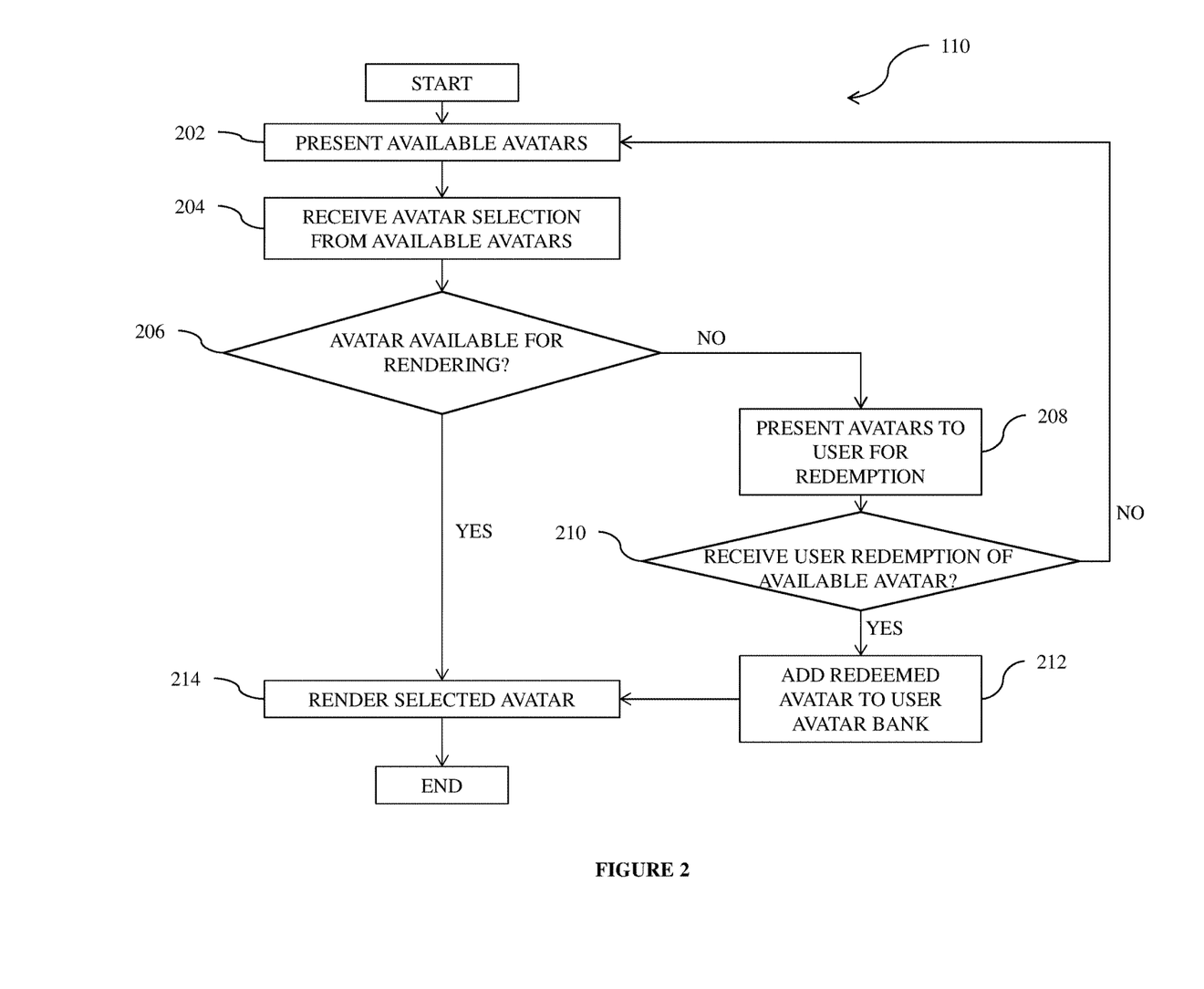
FIG. 2 is a schematic of a method of banking and redeeming avatars.

FIG. 2 is a schematic of a method of banking and redeeming avatars.

Banking module 110 presents available avatars (step 202).

Banking module 110 can present available avatars a user in any manner known in the art. In one embodiment, banking module 110 presents available avatars through user interface 106 on a user's smartphone. For example, banking module 110 can be tied to software, such as a smart phone app, that can register various user actions, including, but not limited to, avatar purchases, browsing history, avatar trades, avatar sales, and avatar subscriptions. It is contemplated that banking module 110 and any associated software can include various user-controllable parameters to alter how much data is shared with banking module 110.

In another embodiment, banking module 110 presents available avatars through a virtual interface. For example, banking module 110 can instantiate as a virtual marketplace in a purely virtual environment, such as within a video game universe. In another example, banking module 110 can instantiate a virtual store in an augmented reality environment, which lets a user input commands though one or more physical actions.

In some embodiments, banking module 110 is subject to restrictions based on the location. For example, a gaming convention can limit the number of avatars resembling the most popular character to increase avatar diversity in an overlaid augmented reality environment.

In yet other embodiments, banking module 110 is subject to restrictions based on legal and/or contractual grounds. For example, banking module 110 can be prohibited from presenting avatars that are licensed for exclusive use by a company's employees, such as an avatar of the company's mascot.

In another example, banking module 110 can be prohibited from presenting avatars to users outside the legal requirements for a particular avatar, such as an avatar occasionally that smokes a cigarette being restricted to adults. In yet another example, banking module 110 can be prohibited from presenting particular characteristics of an avatar, such as an available avatar emote that contains mild nudity being restricted to adults.

Banking module 110 receives an avatar selection from one or more available avatars (step 204).

Banking module 110 can receive an avatar selection in any manner known in the art.

In one embodiment, banking module 110 receives a direct selection from a user via user interface 106. For example, banking module 110 can receive a selection when a user touches an icon associated with an available avatar on a smartphone avatar bank and marketplace. In another example, banking module 110 can receive a selection when a user "touches" an avatar rendered in an augmented reality environment that tracks the user's movements.

In yet another embodiment, banking module 110 can receive a preselection of an avatar from a user in advance. It is further contemplated that the preselection can be subject one or more rules defined by a user, including, for example, preselected avatars based on location and/or surrounding users.

Banking module 110 determines whether a selected avatar is available for immediate rendering (decision block 206).

In response to determining that the selected avatar is available for immediate rendering ("YES" branch, decision block 206), banking module 110 instantiates the selected avatar (step 214).

In one embodiment, banking module 110 renders the selected avatar in an augmented reality environment. In another embodiment, banking module 110 renders the selected avatar in a virtual reality environment.

In response to determining that the selected avatar is not available for immediate rendering ("NO" branch, decision block 206), banking module 110 presents avatars available for redemption by the user (step 208).

It is contemplated that the available avatars can be subject to additional restrictions based on the characteristics of the user, such as age or health conditions. Means of redemption are not limited to legal tender but can also include the redemption of avatars using any exchangeable medium.

In one embodiment, banking module 110 presents avatars that can be paid for with official currency. For example, banking module 110 can offer premium avatars for a $5.00 purchase price or $1.00 per hour rental price. In another example, banking module 110 can offer avatars that can be published with digital currency, which can be purchased through a separate web portal. It is contemplated that such a measure would limit the ability of non-authorized payments being made to purchase avatars (e.g., restrictions on children using their parent's credit cards to purchase skins).

In another embodiment, banking module 110 presents avatars that can be paid for with an alternative form of redemption. For example, banking module 110 can make avatars available for purchase using freely distributed tokens earned by playing a fighting game to purchase game character avatars.

In another embodiment, banking module 110 makes avatars available for redemption through one or more actions. For example, banking module 110 can track data from a user's smartphone and require them to visit 4 different booths in a convention to receive an event exclusive avatar. In yet another example, banking module 110 can track accelerometer data and location data from a user's smartphone and require them to walk a certain number of miles within an hour and then perform 50 squats before earning a Freddie Fitness character skin.

As discussed above, redemption of available avatars can come in many different forms. It is contemplated that users can redeem available avatars through any medium known in the art. In one embodiment, banking module 110 receive an avatar redemption through user interface 106 on computing device 104 via network 102. For example, a user can purchase an avatar through a smartphone marketplace.

In another embodiment, banking module 110 can receive an avatar redemption automatically based on a predetermined agreement. For example, banking module 110 can automatically receive an avatar redemption for a group of users that purchased a gaming season pass and are eligible to receive all new avatars in the calendar year as they release.

In response to determining that the user redemption of the available avatar has been received ("YES" branch, decision block 210), banking module 110 adds a redeemed avatar to a user avatar bank (step 212).

A user avatar bank can be stored in any manner known in the art, including, for example, through distributed data networks, through local persistent storage mediums, and through remote databases, such as server computer 108.

Banking module 110 renders the selected avatar and ends (step 214).

In response to determining that the user redemption of the available avatar has been received ("NO" branch, decision block 210), banking module 110 presents available avatars (step 202).

Figure 3:
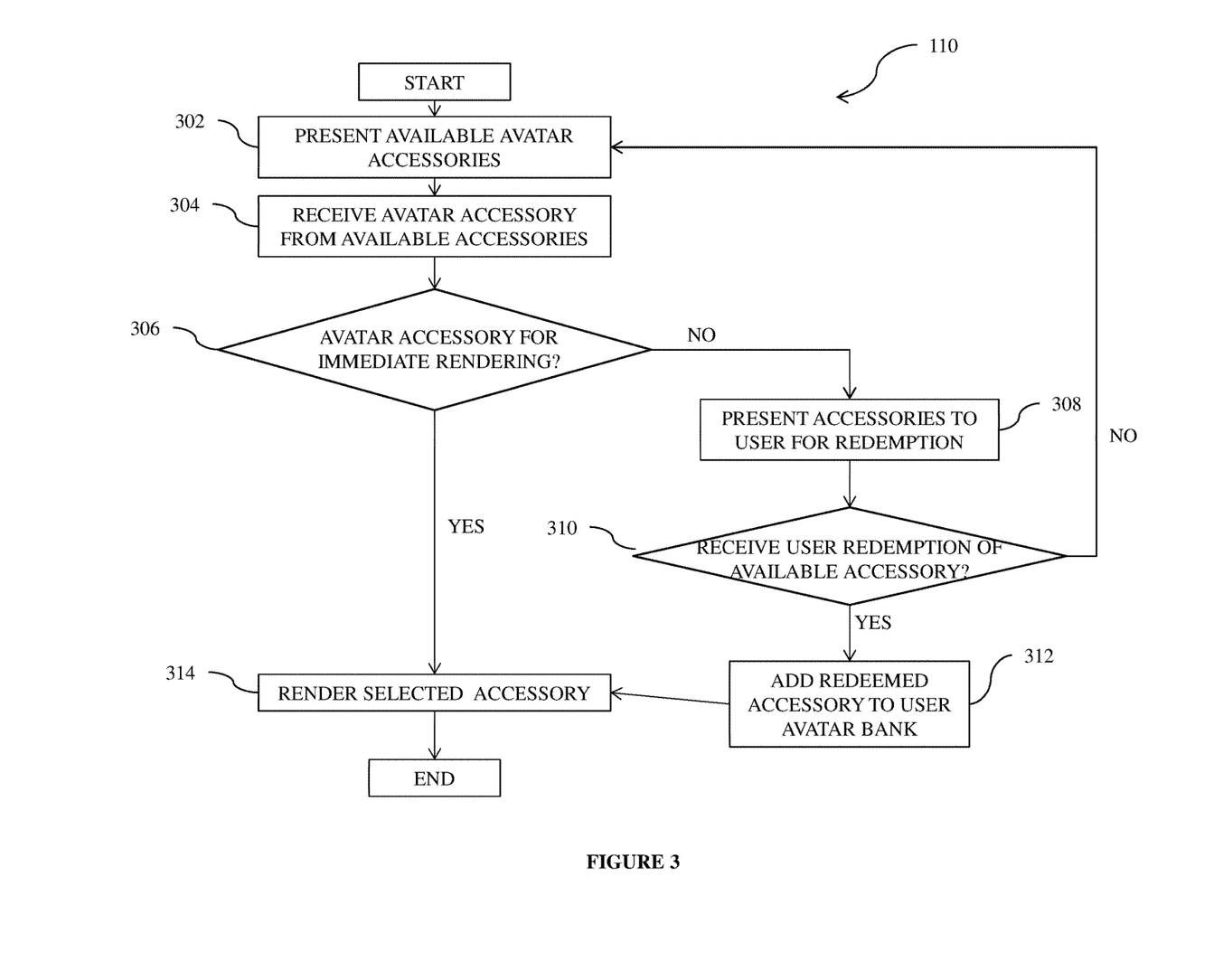
FIG. 3 is a schematic of a method of banking and redeeming avatar accessories.

FIG. 3 is a schematic of a method of banking and redeeming avatar accessories.

Banking module 110 presents available avatar accessories (step 302).

Banking module 110 can present available avatar accessories a user in any manner known in the art. In one embodiment, banking module 110 presents available avatar accessories through user interface 106 on a user's smartphone. For example, banking module 110 can be tied to software, such as a smart phone app, that can register various user actions, including, but not limited to, avatar accessory purchases, browsing history, avatar accessory trades, avatar accessory sales, and avatar accessory subscriptions. It is contemplated that banking module 110 and any associated software can include various user-controllable parameters to alter how much data is shared with banking module 110.

In another embodiment, banking module 110 presents available avatar accessories through a virtual interface. For example, banking module 110 can instantiate as a virtual marketplace in a purely virtual environment, such as within a video game universe. In another example, banking module 110 can instantiate a virtual store in an augmented reality environment, which lets a user input commands though one or more physical actions.

In some embodiments, banking module 110 is subject to restrictions based on the location. For example, a gaming convention can limit the number of avatar accessories resembling the most popular character to increase avatar accessory diversity in an overlaid augmented reality environment.

In yet other embodiments, banking module 110 is subject to restrictions based on legal and/or contractual grounds. For example, banking module 110 can be prohibited from presenting avatar accessories that are licensed for exclusive use by a company's employees, such as a virtual t-shirt with the company's logo.

In another example, banking module 110 can be prohibited from presenting avatar accessories to users outside the legal requirements for a particular avatar, such as an avatar accessory occasionally that smokes a cigarette being restricted to adults. In yet another example, banking module 110 can be prohibited from presenting particular characteristics of an avatar, such as an available avatar accessory emote that contains mild nudity being restricted to adults.

Banking module 110 receives an avatar accessory selection from one or more available avatar accessories (step 304).

Banking module 110 can receive an avatar accessory selection in any manner known in the art.

In one embodiment, banking module 110 receives a direct selection from a user via user interface 106. For example, banking module 110 can receive a selection when a user touches an icon associated with an available avatar accessory on a smartphone avatar accessory bank and marketplace. In another example, banking module 110 can receive a selection when a user "touches" an avatar accessory rendered in an augmented reality environment that tracks the user's movements.

In yet another embodiment, banking module 110 can receive a preselection of an avatar accessory from a user in advance. It is further contemplated that the preselection can be subject one or more rules defined by a user, including, for example, preselected avatar accessories based on location and/or surrounding users.

Banking module 110 determines whether a selected avatar accessory is available for immediate rendering (decision block 306).

In response to determining that the selected avatar accessory is available for immediate rendering ("YES" branch, decision block 306), banking module 110 instantiates the selected avatar accessory (step 314).

In one embodiment, banking module 110 renders the selected avatar accessory in an augmented reality environment. In another embodiment, banking module 110 renders the selected avatar accessory in a virtual reality environment.

In response to determining that the selected avatar accessory is not available for immediate rendering ("NO" branch, decision block 306), banking module 110 presents avatar accessories available for redemption by the user (step 308).

It is contemplated that the available avatar accessories can be subject to additional restrictions based on the characteristics of the user, such as age or health conditions. Means of redemption are not limited to legal tender but can also include the redemption of avatar accessories using any exchangeable medium.

In one embodiment, banking module 110 presents avatar accessories that can be paid for with official currency. For example, banking module 110 can offer premium avatar accessories for a $5.00 purchase price or $1.00 per hour rental price. In another example, banking module 110 can offer avatar accessories that can be published with digital currency, which can be purchased through a separate web portal. It is contemplated that such a measure would limit the ability of non-authorized payments being made to purchase avatar accessories (e.g., restrictions on children using their parent's credit cards to purchase character accessories).

In another embodiment, banking module 110 presents avatar accessories that can be paid for with an alternative form of redemption. For example, banking module 110 can make avatar accessories available for purchase using freely distributed tokens earned by playing a fighting game to purchase virtual game character weapons.

In another embodiment, banking module 110 makes avatar accessories available for redemption through one or more actions. For example, banking module 110 can track data from a user's smartphone and require them to visit 4 different booths in a convention to receive an event exclusive avatar. In yet another example, banking module 110 can track accelerometer data and location data from a user's smartphone and require them to walk a certain number of miles within an hour and then perform 50 squats before earning a virtual set of brand name running shoes for their character.

Banking module 110 determines whether or not a user redemption of an available avatar accessory has been received (decision block 310).

As discussed above, redemption of available avatar accessories can come in many different forms. It is contemplated that users can redeem available avatar accessories through any medium known in the art. In one embodiment, banking module 110 receive an avatar accessory redemption through user interface 106 on computing device 104 via network 102. For example, a user can purchase an avatar accessory through a smartphone marketplace.

In another embodiment, banking module 110 can receive an avatar accessory redemption automatically based on a predetermined agreement. For example, banking module 110 can automatically receive an avatar accessory redemption for a group of users that purchased a gaming season pass and are eligible to receive all new avatar accessories in the calendar year as they release.

In response to determining that the user redemption of the available avatar accessory has been received ("YES" branch, decision block 310), banking module 110 adds a redeemed avatar accessory to a user avatar accessory bank (step 312).

A user avatar accessory bank can be stored in any manner known in the art, including, for example, through distributed data networks, through local persistent storage mediums, and through remote databases, such as server computer 108.

Banking module 110 renders the selected avatar accessory and ends (step 314).

In response to determining that the user redemption of the available avatar accessory has been received ("NO" branch, decision block 310), banking module 110 presents available avatar accessories (step 302).

Figure 4:
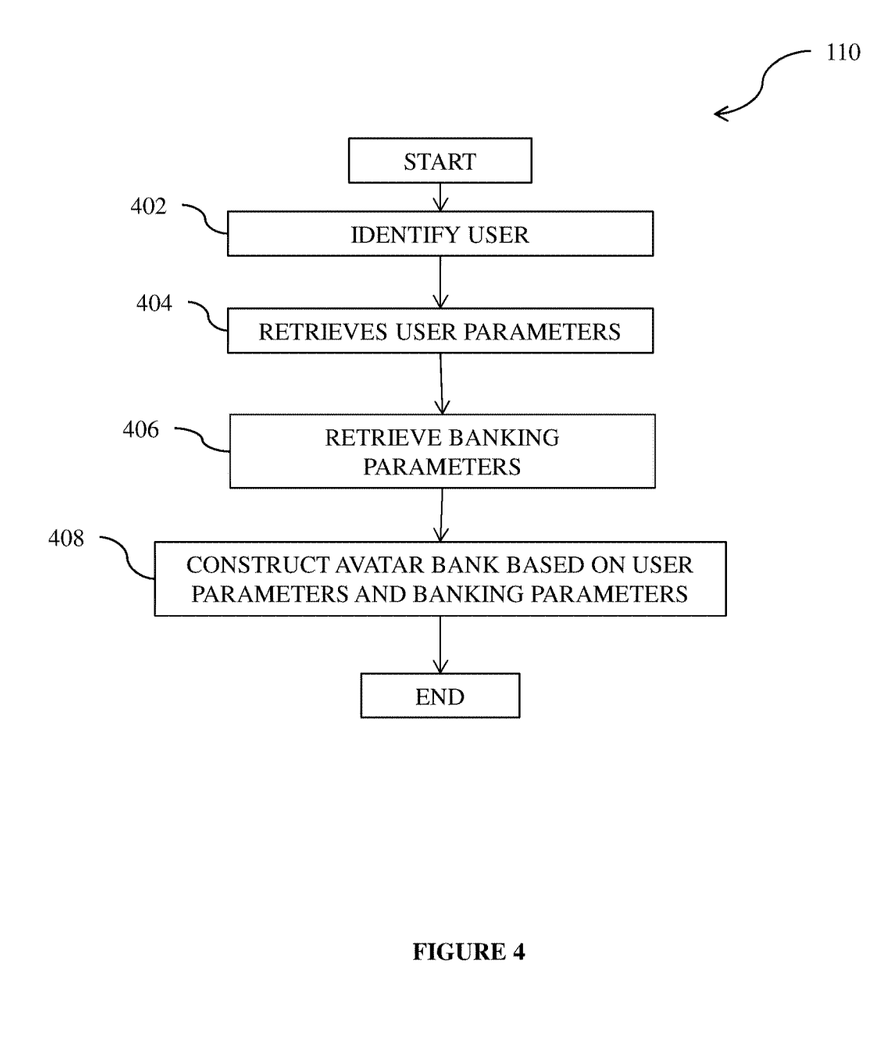
FIG. 4 is a schematic of a method of determining an avatar bank from one or more banking parameters.

FIG. 4 is a schematic of a method of determining an avatar bank from one or more banking parameters.

Banking module 110 identifies a user (step 402).

Banking module 110 can identify a user in any manner known in the art. In one embodiment, banking module 110 identifies a user through a signal sent through computing device 104. For example, banking module 110 can be tied to software, such as a smart phone app, that can register various user actions, including, but not limited to, purchases, browsing, public posts on social media by the user and/or third-parties, and user subscriptions. It is contemplated that banking module 110 and any associated software can include various user-controllable parameters to alter how much data is shared with banking module 110.

In another embodiment, banking module 110 identifies a user through one or more preselected sources. For example, banking module 110 can integrate with a social media application, which can receive location information associated with a user when the user makes a social media post through their smartphone.

In another embodiment, banking module 110 cooperates with one or more hardware functions, such as the accelerometer and a facial recognition camera on a smartphone. In this example, banking module 110 can identify the user associated with facial recognition software and track the accelerometer to determine whether the user is on the move.

In yet another embodiment, banking module 110 receives a direct log-in from the user. For example, a user can download an application associated with an augmented reality platform using banking module 110. When the user logs in and starts using the software, banking module 110 can directly track one or more types of data associated with the user.

Banking module 110 retrieves user parameters (step 404).

User parameters can include any variables associated with a user. User parameters can include, but are not limited to, rules regarding any one or more characteristics of a user (e.g., age, sex, membership, etc.).

In one embodiment, user parameters include rules associated with an administrator of banking module 110 that apply, by default, to a user based on one or more user characteristics.

For example, banking module 110 can determine that a user that is a fan of a particular gaming team is primarily shown highlights from the user's favorite team and players on augmented reality powered displays in a video game competition. In another example, each user in a card-based gaming tournament can only be given the option to put down augmented reality assets on the table that they selected prior to the tournament in an augmented reality "deck".

In another embodiment, user parameters include user-selected rules regarding one or more variables.

For example, a user that identifies with a religion that restricts the use of alcohol and tobacco can input one or more user-selected parameters restricting banking module 110 from presenting any avatars or avatar accessories that are associated with tobacco and/or alcohol in a mixed reality environment.

In another example, banking module 110 can receive a list of one or more banned cards in an augmented reality-based game that two opponents agree to in advance. Based on the rules selected by the opposing teams, banking module 110 can restrict the display of the banned avatars during play.

Banking module 110 retrieves banking parameters (step 406).

Banking parameters can include any variable associated with the execution of banking module 110. Banking parameters can be preset, dynamically altered, or changed manually. It is contemplated that banking parameters can be adjusted in any manner known in the art, including through the use of traditional algorithms and non-traditional algorithms, such as machine learning algorithms.

In one embodiment, banking parameters include limitations on how transactions are executed. For example, banking module 110 can be restricted to only accepting a digital currency associated with a convention's sponsors.

In another example, banking module 110 can be restricted to only presenting a particular number of avatars for purchase to a user per session. In yet another example, banking module 110 can be required to ranking avatars based on one or more metrics, such as the avatars that have the highest sales.

In yet another example, banking module 110 can change the graphical user interface based on banking parameters, such as those that make it harder for children to authenticate purchases using their parents' credit cards.

Banking module 110 constructs an avatar bank based on the user parameters and the banking parameters (step 408).

Figure 5:
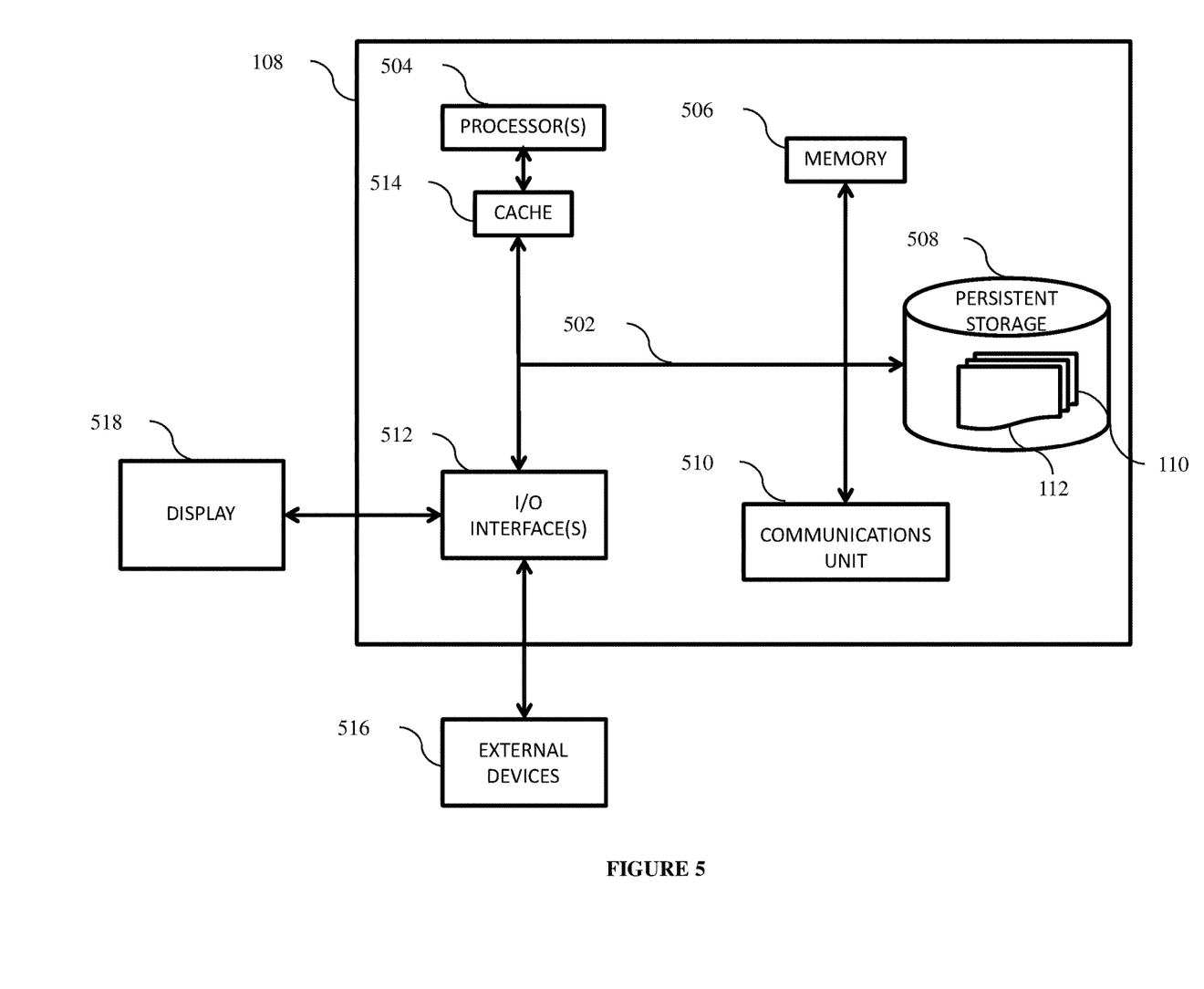
FIG. 5 depicts a block diagram of components of the server computer executing the mixed reality engine within the distributed data processing environment of FIG. 1.

FIG. 5 depicts a block diagram of components of the server computer executing the banking engine 110 within the distributed data processing environment of FIG. 1. FIG. 5 is not limited to the depicted embodiment. Any modification known in the art can be made to the depicted embodiment.

In one embodiment, the computer includes processor(s) 504, cache 514, memory 506, persistent storage 508, communications unit 510, input/output (I/O) interface(s) 512, and communications fabric 502.

Communications fabric 502 provides a communication medium between cache 514, memory 506, persistent storage 508, communications unit 510, and I/O interface 512. Communications fabric 502 can include any means of moving data and/or control information between computer processors, system memory, peripheral devices, and any other hardware components.

Memory 506 and persistent storage 508 are computer readable storage media. As depicted, memory 506 can include any volatile or non-volatile computer storage media. For example, volatile memory can include dynamic random-access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 506 and persistent storage 508 are random access memory and a hard drive hardwired to computing device 504, respectively. For example, computing device 504 can be a computer executing the program instructions of banking module 110 communicatively coupled to a solid-state drive and DRAM.

In some embodiments, persistent storage 508 is removable. For example, persistent storage 508 can be a thumb drive or a card with embedded integrated circuits.

Communications unit 510 provides a medium for communicating with other data processing systems or devices, including data resources used by computing device 104. For example, communications unit 510 can comprise multiple network interface cards. In another example, communications unit 510 can comprise physical and/or wireless communication links.

It is contemplated that banking module 110, database 112, and any other programs can be downloaded to persistent storage 508 using communications unit 510.

In a preferred embodiment, communications unit 510 comprises a global positioning satellite (GPS) device, a cellular data network communications device, and short to intermediate distance communications device (e.g., Bluetooth®, near-field communications, etc.). It is contemplated that communications unit 510 allows computing device 104 to communicate with other computing devices 104 associated with other users.

Display 518 is contemplated to provide a mechanism to display information from banking module 110 through computing device 104. In preferred embodiments, display 518 can have additional functionalities. For example, display 518 can be a pressure-based touch screen or a capacitive touch screen.

In yet other embodiments, display 518 can be any combination of sensory output devices, such as, for example, a speaker that communicates information to a user and/or a vibration/haptic feedback mechanism. For example, display 518 can be a combination of a touchscreen in the dashboard of a car, a voice command-based communication system, and a vibrating bracelet worn by a user to communicate information through a series of vibrations.

It is contemplated that display 518 does not need to be physically hardwired components and can, instead, be a collection of different devices that cooperatively communicate information to a user.

Figure 6A:
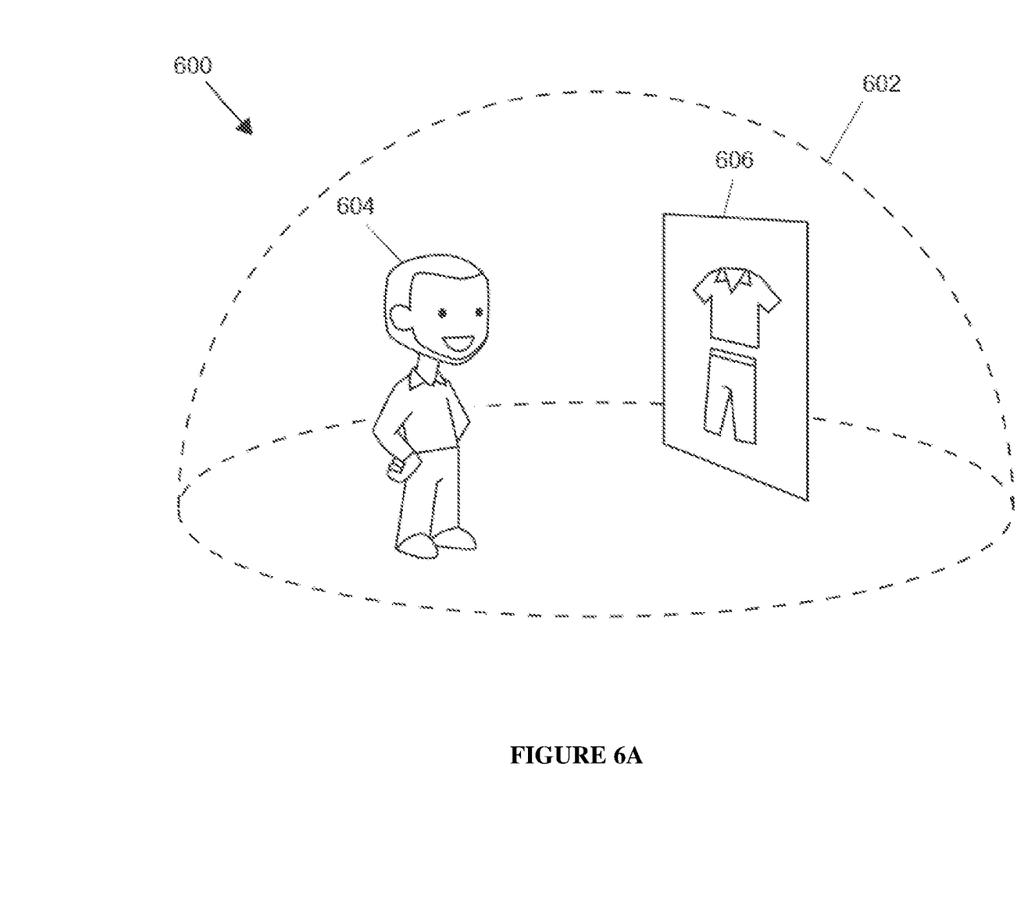
FIGS. 6A and 6B depict the use of a banking module allowing the user to configure an avatar appearance and execute transactions through a user interface.

FIG. 6A depicts an augmented reality environment with user interfaces allowing avatar and augmented reality environments modification.

In the depicted embodiment, augmented reality environment 600 includes a three dimensional space about user 604 and user interface 606. User interface 606 can have any combination of functionality including, for example, a means of purchasing, selling, trading, and selecting one or more avatars. It is further contemplated that user interface 606 can also provide a system allowing a user to purchase alternative virtual elements, such as visual effects and emotes, and real-world goods to be delivered or picked up by user 604.

Figure 6B:
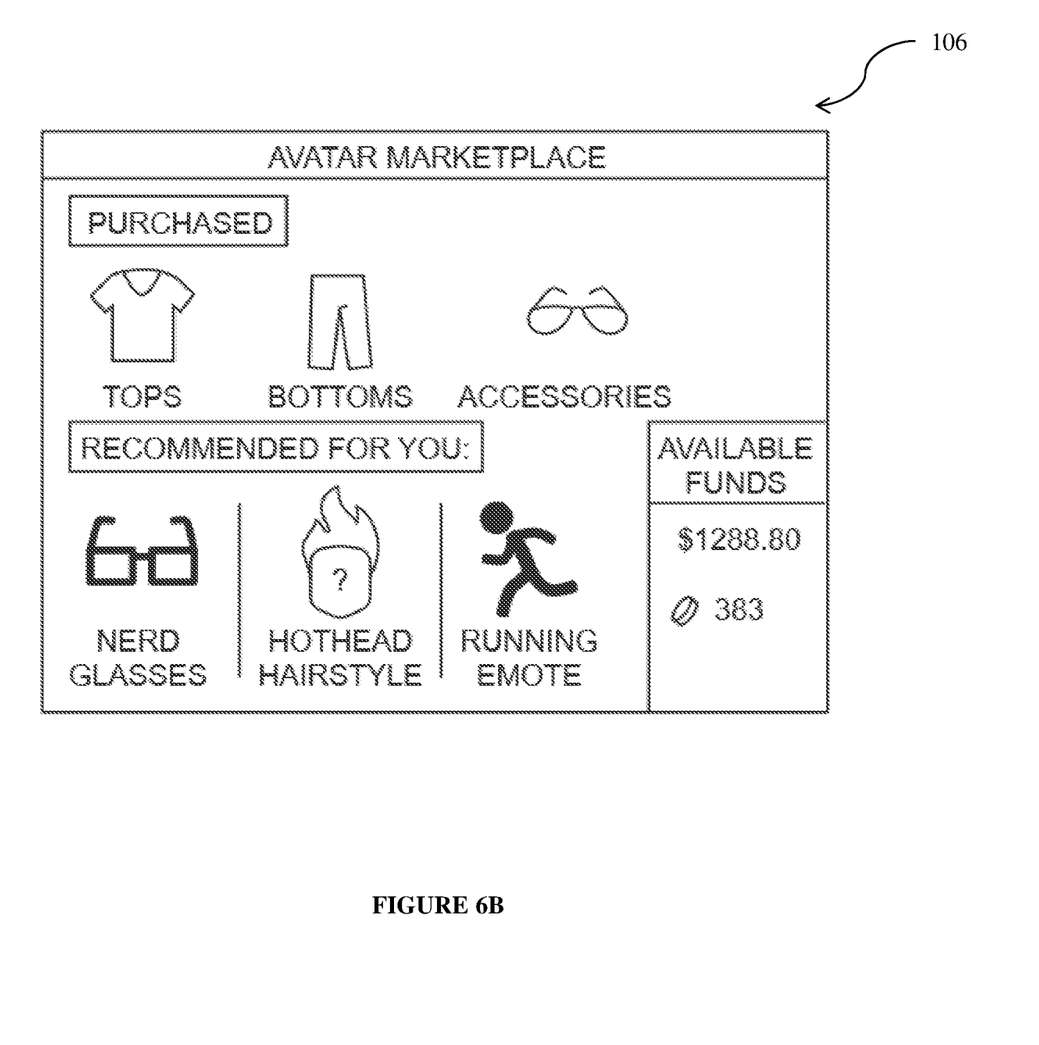

FIG. 6B depicts one embodiment of a user interface coupled to banking module 110.

The embodiment in FIG. 6B depicts an illustrative example of user interface 106. User interface 106 provides an avatar marketplace that divides virtual and/or physical goods (e.g., order history depicting physical goods delivered to physical address) into purchased and purchasable content. The avatar market place is also contemplated to include one or more graphical elements that indicate the amount of any one or more compensatory mediums associated with a user.

User interface 106 is contemplated to be a dynamic interface. As such, the present invention contemplates a dynamic interface that has any one or more sub-divisions and associated data elements. It is further contemplated that user interface 106 can be updated and patched through network 102 to change one or more visual and/or functional features of user interface 106.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using one or more computer processors to manage economic transactions associated with avatars across multiple proprietary augmented reality platforms, comprising:
    retrieving available avatars;
    presenting the available avatars to a user;
    receiving an avatar selection from the user; and
    determining whether the avatar selection is available for rendering, wherein at least one of the availability of the avatar selection and permission to render the avatar are at least partially dependent on one or more permissions associated with the user based on user characteristics, and wherein the user characteristics include a user location and a popularity of the avatar at the user location, wherein the availability of the avatar is limited for avatars representing a popular character at the user location; and
    responsive to determining that the avatar selection is not available for rendering,
    determining whether the avatar selection is accessible to the user; and
    responsive to determining that the avatar selection is not accessible to the user, presenting the avatar selection for redemption.

2. The method of claim 1, further comprising;
    determining whether a user redemption of the avatar selection is received;
    responsive to determining that the user redemption of the avatar selection is received, adding the avatar selection to a user avatar bank, wherein the user avatar bank is available for use in a first proprietary augmented reality platform and a second proprietary augmented reality platform; and
    rendering the avatar selection.

3. The method of claim 1, further comprising;
    determining whether a user redemption of the avatar selection is received;
    responsive to determining that the user redemption of the avatar selection has not been received, presenting the available avatars.

4. A method of using one or more computer processors to manage banking and banking transactions associated with avatar accessories across multiple proprietary augmented reality platforms, comprising:
    retrieving available avatar accessories;
    presenting the available avatar accessories to a user;
    receiving an avatar accessory selection from the user;

determining whether the avatar accessory selection is available for rendering, wherein at least one of the availability of the avatar accessory selection and permission to render the avatar accessory are at least partially dependent on one or more permissions associated with the user based on user characteristics, and wherein the user characteristics include a user location and a popularity of the avatar at the user location, wherein the availability of the avatar accessory is limited for avatars representing a popular character at the user location; and responsive to determining that the avatar accessory selection is not available for rendering,
    determining whether the avatar accessory selection is accessible to the user; and
    responsive to determining that the avatar accessory selection is not accessible to the user, presenting the avatar accessory selection for redemption.

5. The method of claim 4, further comprising;
determining whether a user redemption of the avatar accessory selection is received;
responsive to determining that the user redemption of the avatar accessory selection has been received, adding the avatar selection to a user avatar accessory bank, wherein the user avatar bank is available for use in a first proprietary augmented reality platform and a second proprietary augmented reality platform; and
rendering the avatar accessory selection.

6. The method of claim 4, further comprising;
determining whether a user redemption of the avatar accessory selection is received;
responsive to determining that the user redemption of the avatar accessory selection has not been received, presenting available avatar accessories.

\* \* \* \* \*